May 14, 1968   W. E. FROST ET AL   3,383,125
EXPANSION JOINT
Filed Sept. 27, 1966   3 Sheets-Sheet 1
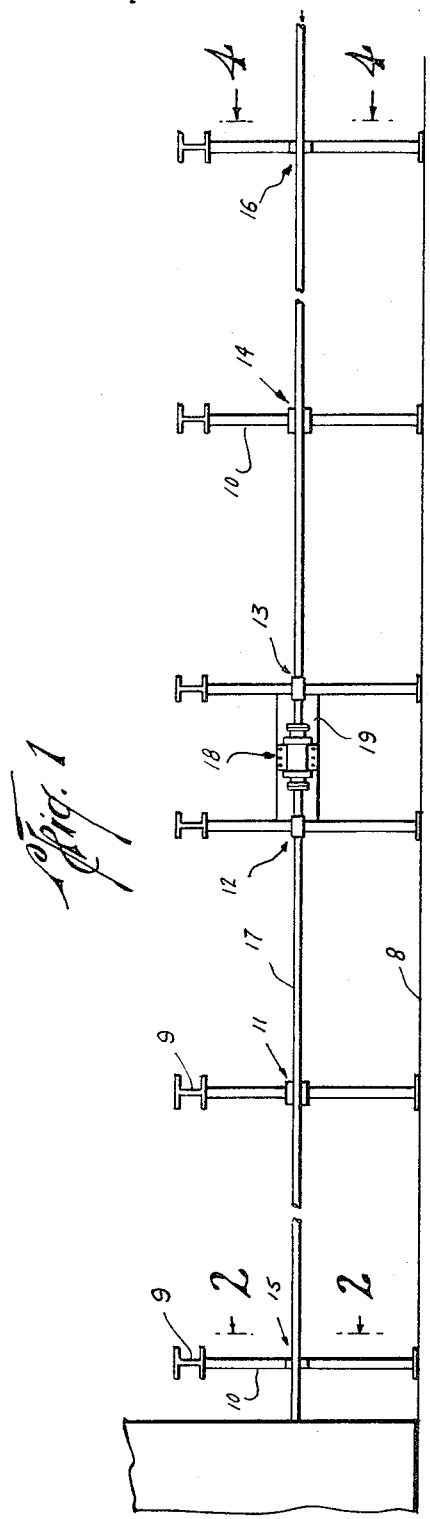
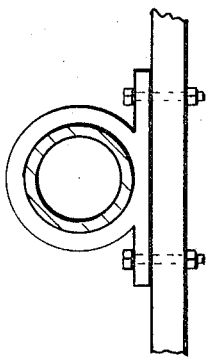
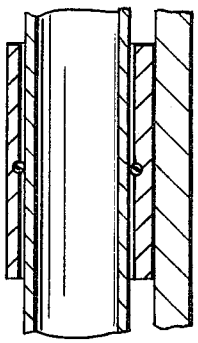
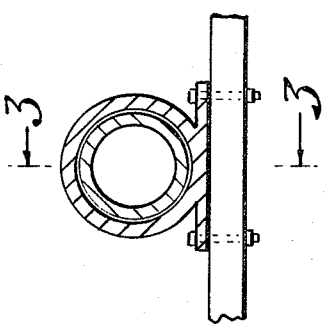
Winston E. Frost
Carlton H. Stanley
INVENTORS
BY Bertram H. Mann
ATTORNEY

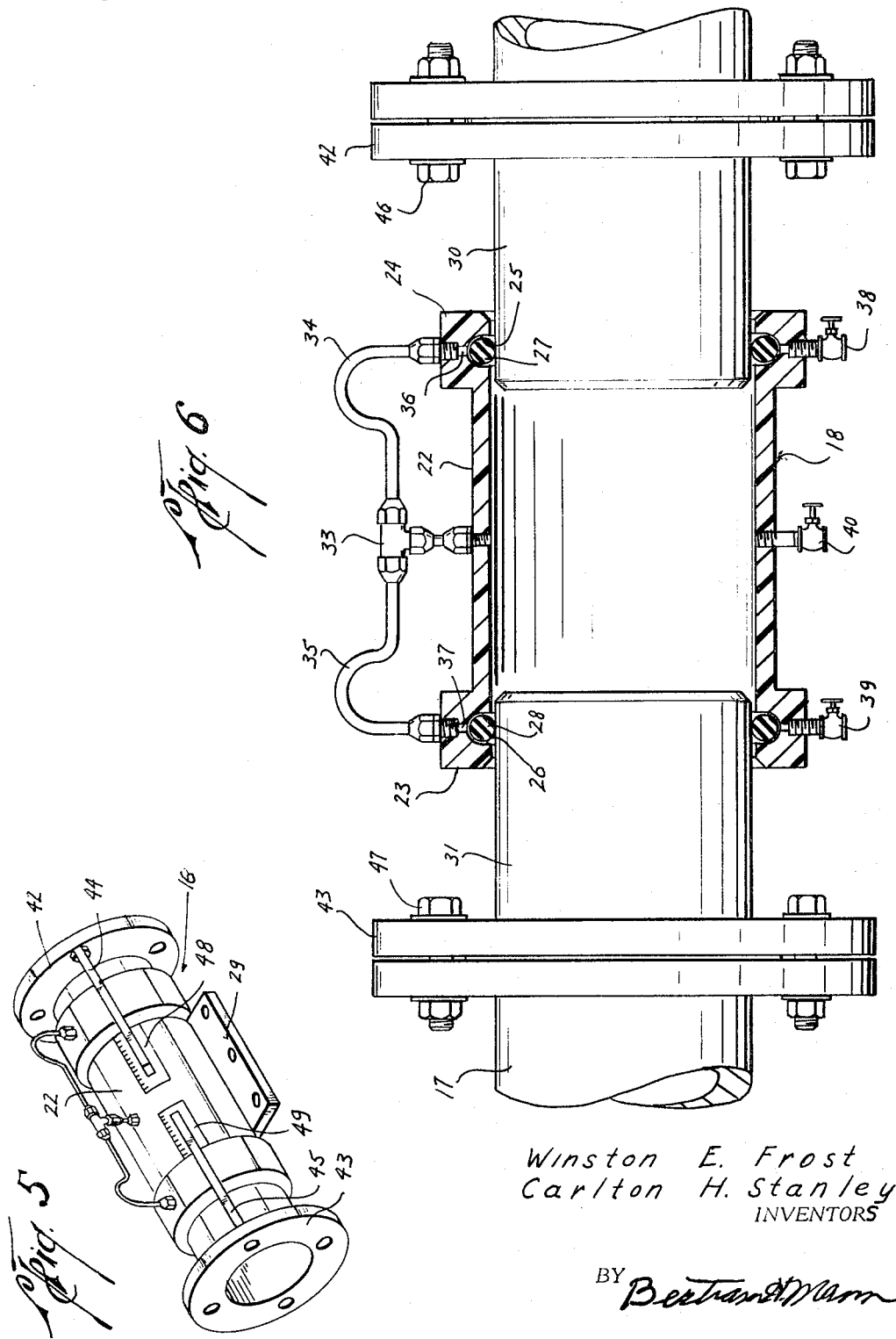

May 14, 1968 W. E. FROST ETAL 3,383,125
EXPANSION JOINT
Filed Sept. 27, 1966 3 Sheets-Sheet 3
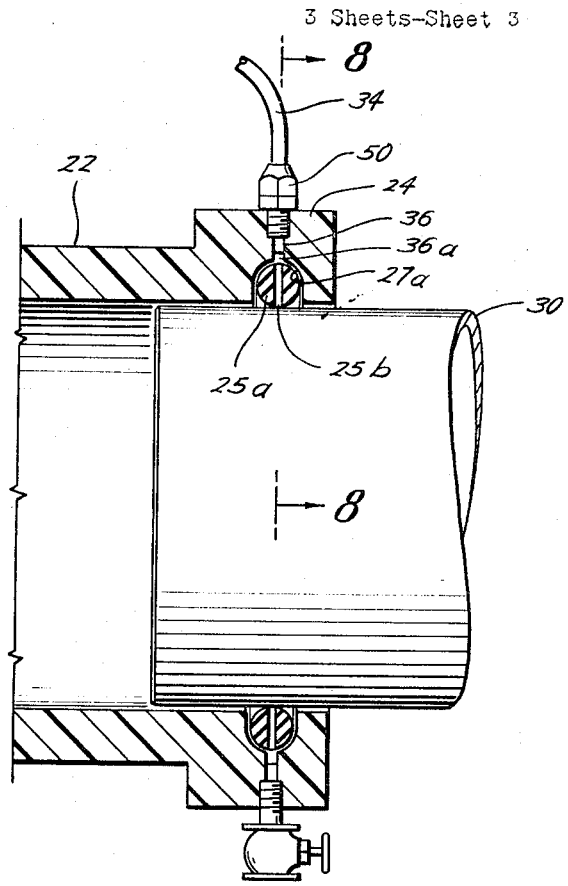
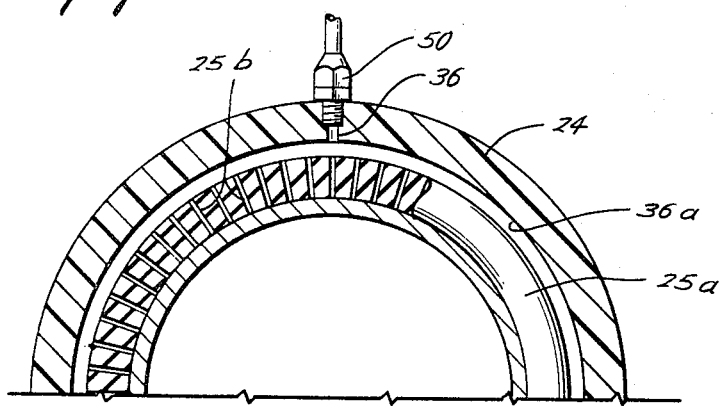
Winston E. Frost
Carlton H. Stanley
INVENTORS
BY Bertram H. Mann
ATTORNEY 3,383,125
EXPANSION JOINT
Winston E. Frost, Houston, and Carlton H. Stanley, Pasadena, Tex., assignors to Stanley-Frost Engineering Corporation, Houston, Tex., a corporation of Texas
Continuation-in-part of application Ser. No. 542,350, Apr. 13, 1966. This application Sept. 27, 1966, Ser. No. 584,633
2 Claims. (Cl. 285—94)

ABSTRACT OF THE DISCLOSURE

An expansion joint especially adaptable for use with plastic piping. Sealingly and telescopingly received within the ends of a coupling sleeve are smooth or polished pipe ends, both the sleeve and pipe ends preferably being of plastic material. The internal or other pressure is directed through a lubricant pack to the outer surfaces of O-ring seals between the sleeve and pipe ends, and orifices through the seal packings provide for direct feedings of lubricant to the bearing faces of the O-rings.

---

This is a continuation-in-part of our copending application Ser. No. 542,350, filed Apr. 13, 1966 and now abandoned. This invention relates to thermal piping as for air conditioning systems for carrying a heating or cooling fluid medium. The invention consists more particularly in novel expansion joint means for such piping.

Many air conditioning systems as now designed for buildings or building complexes require pipelines of considerable length for carrying hot water, steam, steam condensate, hot air, or like heating or cooling medium to the area to be affected. Such pipes are subjected to substantial temperature variations and, consequently, substantial linear expansion and contraction thereof must be accommodated, usually by the insertion of expansion joints strategically in the system. The type of expansion joint having greatest acceptance in the heating industry is the bellows-type joint in which the separated pipe ends are sealingly connected by metal bellows, the accordion-folded walls of which will provide for limited axial expansion and contraction. Since these expansion joints are relatively expensive, it is desirable to use as few as possible in the system. For instance, in a recent installation of steam condensate piping in a 300-foot air conditioning tunnel subject to a temperature variation of 212 degrees F., a total expansion allowance of six inches was specified. This would have required a bellows-type joint on the order of two feet in length which is impractical for a single joint of this type. The cost of bellows-type expansion jointing of such proportions would run on the order of six hundred dollars, while the weight thereof would be from five hundred to six hundred pounds, requiring substantial and expensive support structures.

Another problem in the use of metal bellows-type expansion joints of the conventional type mentioned is frequent damage due to electrolytic and corrosive action as well as so-called stress corrosion cracking due, for instance, to the presence of chlorides or other acids in the fluid transported. In the above-noted recent large heating installation in the vicinity of Houston, Tex., chlorides existent in the condensate to the extent of one part per million to five parts per million resulted in a hundred percent loss and replacement of bellows-type expansion joints after only brief service, at a cost of over fifty thousand dollars.

This problem inherent in the use of such expansion joints is well-known to the industry, but in a report published in October 1964, by the Expansion Joint Manufacturers Association, Inc., of 53 Park Place, New York, N.Y., the only solution offered was to "get rid of chlorides and/or oxygen, or substitute high nickel alloys, and don't forget to protect the bellows from the outside as well." Obviously, such solutions simply increase the cost of the installation, while only increasing the life of the joint, without eliminating the necessity of replacing the same one or more times during the life of the system.

Recently, palstic pipe has become commercially available, for instance, laminated Fiberglas pipe, which will effectively resist corrosion and electrolytic damage of the type mentioned. However, such plastic piping does not have adequate resistance to compressive and bending forces to permit the use of the mentioned bellows-type expansion joints which require linear end thrust pressures as much as eight thousand pounds-per-square-inch to compress the bellows.

Other types of expansion joints—for instance, those utilizing pipe loops and nut-tightened glands—have been tried, but none has proven wholly successful to resist the internal pressures and corrosive action involved. Moreover, no such expansion design has yet been offered which lends itself to use with modern, lightweight, highly durable, non-metal plastic pipe.

Accordingly, an object of the present invention is to provide an expansion joint for use with thermal piping which is much more durable than previous types of expansion joints, as mentioned.

Another object is to provide an expansion joint which requires substantially less end thrust for operation than previous types of expansion joints.

Another object is to provide an expansion joint which is substantially simpler, lighter, and less expensive than previous joints.

Another object is to provide an expansion joint which will accommodate substantially more expansion and contraction action for the same length of joint, both linearly and in number of reciprocations, than previous devices for the same purpose.

Still another object is to provide an expansion joint which is well-adapted for use with lightweight plastic piping.

These objects and others hereafter appearing are attained substantially in the novel expansion joint herein described which comprises a sleeve, preferably of durable, non-metal plastic material, internally receiving at the ends thereof O-rings, preferably of low friction material such as silicon-impregnated rubber. Telescopingly received within the ends of the sleeve are smooth or polished pipe ends, also preferably of non-metal plastic, which sealingly and slidingly engage the O-rings and which, preferably, are provided with flanges or other means for attachment in a line of pipe. Novel means are provided for equalizing the pressure across the O-rings and also indicator means are provided for visibly marking the expansive condition of the joint.

In the accompanying drawings which illustrate the invention,

FIG. 1 is a schematic plan view showing a portion of a heat piping system, including the novel expansion joint;

FIGS. 2, 3, and 4 are enlarged detail sections taken substantially on the corresponding section lines of FIG. 1;

FIG. 5 is an isometric view of the new joint;

FIG. 6 is a vertical longitudinal center section of the joint on an enlarged scale;

FIG. 7 is a detail longitudinal section illustrating a modified joint; and

FIG. 8 is a partial transverse section taken on line 8—8 of FIG. 7.

FIG. 1 shows in plan view a portion of an air conditioning tunnel including, for instance, the side wall 8 and a row of vertical posts 9 parallel to and spaced therefrom.

Horizontal beams 10 rest upon posts 9 and are supported at their opposite ends on wall 8. On the beams 10 are mounted pipe guides generally designated 11, 12, 13, and 14 and pipe anchors 15 and 16. A line of pipe 17 extends through the guides and anchors and, between the intermediate guides 12 and 13, is provided with an expansion joint, generally designated 18, resting on a support plate 19.

The expansion joint, a first form of which is best shown in FIG. 6, comprises a sleeve 22, preferably consisting of integral plastic material such as epoxy laminated glass fibers of adequate strength and durability to resist the forces and corrosive influences involved. The ends of the sleeve are enlarged at 23 and 24 and these end portions are provided with internal circumferential grooves 25 and 26. Snugly received in the grooves are O-rings 27 and 28 of a suitable sealing and low friction material such as silicone-impregnated rubber. In an exemplary embodiment in a three-inch joint, a 5/8-inch diameter O-ring was received within a machined groove of a half-inch depth so that the O-ring projected 1/16-inch inwardly from the inner surface of the sleeve member, in the unassembled condition. Formed on the bottom of the sleeve are base flanges 29 for bolting the support plate 19.

Telescopingly received within the ends of sleeve member 22 and sealingly and slidingly engaging the O-rings 27 and 28 are the short pipe end sections 30 and 31, preferably of the same or other suitable plastic, non-metallic material as the sleeve. The outer surface of each pipe end section, preferably, is smoothly polished and perfectly round to a tolerance of plus or minus .005-inch. With these O-rings and telescoping pipe end constructions, resistance to relative sliding or telescoping movements of the parts is reduced so that, in effect, the only end thrust force required to be applied to the pipe end members 30 and 31 for sliding within the sleeve member 20 is the end thrust just sufficient to overcome the internal pressure which, in an exemplary heating system, would be on the order of fifty pounds-per-square-inch.

In order to counterbalance the internal pressures on the O-rings 27 and 28 and thus cause the O-rings to bear more firmly against its engaged pipe and further resist leakage therepast, a T-fitting 33 is screwed into the mid portion of sleeve 22 and communicates the interior of the line through branch pipes 34 and 35 with partially-threaded holes 36 and 37 which open through the radially outward portions of grooves 25 and 26 and against the back surfaces of the O-rings. Thus, the internal fluid pressures within sleeve 22 are applied to the radially outward faces of the O-rings and tend to counteract fluid pressure applied to the inner faces of the O-rings exposed to the sliding parts 30 and 31. Valved fittings 38 and 39 provide for additional balancing connections, where desired. A valved drain port 40 is provided on the under surface of the sleeve.

Each end pipe member 30 and 31 is provided with a bolting flange, as 42 and 43, for attachment to the adjacent ends of the line of piping 17 which, though conveniently of non-metallic plastic material, may be of any suitable material. For visibly indicating the expansive condition of the joint, a pair of marker fingers 44 and 45 project from flanges 42 and 43, being conveniently secured by means of one of the flange bolts 46 or 47. The fingers 44 and 45 terminate in juxtaposition with indexing scales 48 and 49 for ready visible indication as to the extent of telescoping of the pipe end and sleeve parts. Fingers 44 and 45 may cooperate with each other instead of with markings on the sleeve, if desired, to provide this indication.

The form of joint in FIGS. 7 and 8 is like that shown in the previous form and corresponding parts are designated by the same reference numerals Here the O-ring 25a is provided with radial grease orifices 25b all of which communicate with a circumferential groove 36a in O-ring groove 27a. Radial duct or ducts 36 connecting with groove 27a are packed with a suitable lubricant material, such as silicone lubricant-grease, which will withstand the pressure, temperature, and chemical actions involved. The orifices 36 and 25b are gauged in relation to the contemplated pressure supplied through tube 34 and the viscosity of the grease used to maintain the packing under adequate pressure to properly seal as well as lubricate the engaging surfaces of the O-ring and pipe end 30. While, in FIG. 7, clearance is shown, for clearness, between O-ring 25a and its groove, it will be understood that no such clearance will be present in the assembly due to expansion of the O-ring into tight sealing fit with the grooved side walls.

We have found that in some cases lubrication of the telescoping parts, as is achieved in the modification, is essential for maximum life of the sealing elements of the joint. For instance, in one installation, a joint lubricated according to the modification withstood 30,000 reciprocations, without failure, whereas the unlubricated joint had failed after only 2,800 cycles.

With the novel expansion joint constructions herein described, substantial reductions in weight and cost are achieved together with practically complete avoidance of the kind of corrosive, electrolytic, and stress damage which has been prevalant with the use of prior types of expansion joints. For instance, in the exemplary installation first mentioned above, involving a three-inch pipe joint, the cost was one-half the cost of a comparable bellows-type joint, while a weight reduction of from five hundred to six hundred pounds for a bellows-type joint to approximately one hundred pounds for our novel joint was achieved. The novel joint, of course, will absorb substantial vibrations without noise and also will tolerate limited disalignment of the telescoping pipe ends and sleeve parts.

With such joint it is readily possible from time to time to renew the O-ring seals simply by unbolting the flanges 42 and 43 and the support flanges 29 by means of which the sleeve 22 is anchored to plate 19, then to lift the joint from between the pipe ends, withdraw the flanged pipe end sections 30 and 31 from sleeve 22, make the necessary inspection and replacement of the O-rings, then reinstall the joint. In the modified form, it may be advisable to occasionally remove fittings 50 and repack orifices 36. Tests indicate that, with such occasional replacement of the O-rings, the expansion joint will last the lifetime of the usual heating system. Moreover, a joint of the novel construction described, for a given length, will accommodate more pipe expansion than will a bellows-type expansion joint of the same size. For instance, a three-inch joint of our design having a sleeve of total length of twelve inches would allow for six-inch expansive movement of the pipe ends. A bellows-type joint would have to be approximately twice as long to accommodate this much movement.

The invention may be modified in various respects as will occur to those skilled in the art, and the exclusive use of all modifications as come within the scope of the appended claims is contemplated.

We claim:
1. An expansion joint for a line of expansible and contractible pipe comprising an exteriorly smooth pipe end portion, a sleeve telescopingly receiving said pipe end portion, both said sleeve and said end portion being of non-metallic, corrosion-resistant plastic material, an internal circumferential groove in said sleeve and an O-ring packing of elastomeric material in said groove sealingly engaging the sides of said groove and the confronting pipe end portion under working conditions, a fluid duct connecting with the radially outward part of said groove, a charge of fluent lubricant in said groove, and means for applying fluid pressure to said duct and said lubricant charge, there being one or more orifices in said packing for conducting said pressured lubricant directly to said interface for lubricating the same.

2. An expansion joint as described in claim 1 for use with non-metallic, corrosion-resistant plastic pipe and including a pair of pipe end portions telescopingly received in said sleeve, a pair of longitudinally spaced internal grooves in said sleeve respectively confronting said end portions, a fluid duct connecting with each of said grooves, and means for pressuring both of said ducts for applying sealing force to said packing sufficient to counterbalance fluid forces applied to said interfaces and for feeding lubricant directly to said interfaces.

References Cited

UNITED STATES PATENTS

| | | | |
|---|---|---|---|
| 3,284,110 | 11/1966 | Marcus et al. | 285—260 X |
| 1,806,081 | 5/1931 | Pratt | 285—298 X |
| 2,232,824 | 2/1941 | Mahu | 285—298 X |
| 2,323,179 | 6/1943 | Hall et al. | 285—96 X |
| 2,404,494 | 7/1946 | Halby et al. | 285—94 |
| 2,748,869 | 6/1956 | Hager | 285—96 X |
| 2,502,351 | 3/1950 | Smith | 285—96 X |
| 2,774,621 | 12/1956 | Kilbourne. | |
| 2,922,664 | 1/1960 | Risley et al. | 285—96 |
| 2,998,269 | 8/1961 | Houghton | 285—236 X |
| 3,107,931 | 10/1963 | Killian | 285—236 X |
| 3,156,789 | 11/1964 | Deringer. | |

FOREIGN PATENTS

| | | |
|---|---|---|
| 1,310,665 | 10/1962 | France. |
| 297,841 | 5/1917 | Germany. |

EDWARD C. ALLEN, *Primary Examiner.*

R. G. BERKLEY, *Assistant Examiner.*